United States Patent
Pezzo et al.

(10) Patent No.: US 10,890,324 B2
(45) Date of Patent: Jan. 12, 2021

(54) OXY-FUEL TORCH HAVING QUICK CONNECTION MEANS

(71) Applicant: Lincoln Electric Italia S.r.l., Serra Ricco (IT)

(72) Inventors: Ivan Pezzo, San Martino Buon Albergo (IT); Silvano Bendazzoli, Verona (IT); Federico Girardi, Verona (IT)

(73) Assignee: LINCOLN ELECTRIC ITALIA S.R.L., Serra Ricco (IT)

( * ) Notice: Subject to any disclaimer, the term of this patent is extended or adjusted under 35 U.S.C. 154(b) by 113 days.

(21) Appl. No.: 16/190,379

(22) Filed: Nov. 14, 2018

(65) Prior Publication Data

US 2019/0078778 A1    Mar. 14, 2019

Related U.S. Application Data

(63) Continuation of application No. PCT/EP2017/060403, filed on May 2, 2017.

(30) Foreign Application Priority Data

Jun. 17, 2016 (EP) .................................... 16425058

(51) Int. Cl.
*B23K 7/00* (2006.01)
*F23D 14/46* (2006.01)
(Continued)

(52) U.S. Cl.
CPC .......... *F23D 14/465* (2013.01); *F16L 37/084* (2013.01); *F16L 37/23* (2013.01);
(Continued)

(58) Field of Classification Search
CPC ................................ B23K 9/00; F23D 14/465
See application file for complete search history.

(56) References Cited

U.S. PATENT DOCUMENTS 2,506,114 A   5/1950   Sparks
3,679,171 A   7/1972   Baranowski, Jr.
(Continued)

FOREIGN PATENT DOCUMENTS

CN   20269054         1/2013
CN   103075732 A      5/2013
(Continued)

OTHER PUBLICATIONS

International Search Report and Written Opinion from Corresponding Application No. PCT/EP2017/060403, dated Dec. 21, 2017; pp. 1-10.

(Continued)

*Primary Examiner* — Scott R Kastler
(74) *Attorney, Agent, or Firm* — Brad C. Spencer

(57) ABSTRACT

The invention related to an oxy-fuel torch comprising a handle By which the torch can be manipulated, at least two gas channels arranged through said handle for conveying at least a flow of fuel gas and a flow of oxidizing gas between respective inlets ports and outlet ports, and inlet connectors in fluidic communication with each inlet ports, the inlet connectors being configured to fluidly connect each inlet port to corresponding gas hose via intermediate connection means. According to the each inlet connector is a non-threaded connector and is permanently connected with each inlet port.

20 Claims, 3 Drawing Sheets

(51) Int. Cl.
*F23D 14/38* (2006.01)
*F23D 14/28* (2006.01)
*F16L 37/23* (2006.01)
*F16L 37/084* (2006.01)
*F23D 14/32* (2006.01)

(52) U.S. Cl.
CPC .............. *F23D 14/28* (2013.01); *F23D 14/32* (2013.01); *F23D 14/38* (2013.01); *Y02E 20/34* (2013.01)

(56) References Cited

U.S. PATENT DOCUMENTS

| | | | |
|---|---|---|---|
| 3,761,117 A | | 9/1973 | Shendure |
| 4,779,608 A | * | 10/1988 | Smith ..................... F23Q 13/04 126/25 B |

FOREIGN PATENT DOCUMENTS

| | | |
|---|---|---|
| CN | 104741262 A | 7/2015 |
| CN | 105570895 A | 5/2016 |
| FR | 645 960 A | 11/1928 |
| FR | 2 122 880 A5 | 9/1972 |
| GB | 1 381 887 A | 1/1975 |

OTHER PUBLICATIONS

International Report on Patentability from Corresponding Application No. PCT/EP20171060403; dated Dec. 27, 2018 (10 pages).

* cited by examiner

OXY-FUEL TORCH HAVING QUICK CONNECTION MEANS

BACKGROUND OF THE INVENTION

The present invention relates to an oxy-fuel torch, in particular an oxy-fuel cutting torch, an oxy-fuel assembly comprising such a torch, as well as a method for cutting, welding, brazing or heating at least on metallic workpiece using an assembly according to the invention.

Oxy-fuel welding and oxy-fuel cutting are processes that use fuel gases and oxygen to weld and cut metals. In a way known per se, an oxy-fuel apparatus comprises basically at least an oxidizing gas source, such as pure oxygen or an oxygen-containing gas, such as air, and a fuel gas source, typically acetylene, at least two flexible gas hoses connected to each source, and a torch, also called blowpipe or blowtorch, fluidly connected to said hoses via fluid-tight connecting means. The torch has a handle for the user to grasp, and a mixing chamber where the fuel gas and oxygen are mixed so as to form a flame at the tip of the torch.

More precisely, at least two gas channels extend through the handle of the torch so as to convey at least a flow of fuel gas and a flow of oxidizing gas between respective inlet ports and outlet ports.

In general, each inlet port is equipped with threaded inlet connectors. Coupling nuts are used as threaded fastener for joining the inlet connectors with threaded hose tails that are mounted at the end of each hose. Alternatively, quick connection nipples can be threaded onto each inlet via threaded nuts.

But the threaded design of the fluid-tight connecting means raises several issues.

Indeed, the features of the threaded connections for gas hoses, notably in terms of diameters and thread pitches, are standardized according to the type of gas. But these standards differ according to the country of use. Hence, it is necessary to manufacture different types of oxy-fuel torches, depending on the country, the only difference between these torches being the threads of the inlet connectors.

Furthermore, the prior inlet connectors are fragile and sensitive to dust due to their threaded design.

Another deficiency of prior inlet connectors is that they are generally mounted on the torch so that they project beyond the torch handle. The connectors are thus directly exposed to the environment and can be damaged during the transportation and handing of the torch.

An object of the present invention is thus to overcome some or all of the disadvantages of the prior art mentioned above.

BRIEF SUMMARY OF THE INVENTION

To this end, the solution according to the invention is an oxy-fuel torch comprising:
- a handle by which the torch can be manipulated,
- at least two gas channels arranged through said handle for conveying at least a flow of fuel gas and a flow of oxidizing gas between respective inlets ports and outlet ports, and
- inlet connectors in fluidic communication with each inlet ports, the inlet connectors being configured to fluidly connect each inlet port to a corresponding gas hose via intermediate connection means, characterized in that each inlet connector is a non-threaded connector and is permanently connected with each respective inlet port.

Furthermore, other embodiments of the invention may include one or more of the following characteristics:
- each inlet connector is joined to each inlet port by brazing.
- the intermediate connection means comprise quick connectors, each inlet connectors having a male coupling portion configured to cooperate with a female head portion of each quick connector in order to retain said inlet connectors and said quick connectors in fastened configuration.
- each male coupling portion is provided with at least one element in relief adapted to cooperate with a corresponding element in relief of the female head portion of each quick connector in order to retain said elements in relief in fitted configuration.
- each male coupling portion comprises a tubular member provided with at least one circumferential protrusion arranged at a predetermined distance from the free end of the tubular member so as to engage at least one bearing of the female head portion of each quick connector with said protrusion.
- the handle extends globally parallel to a longitudinal axis X-X between a front side located on the side of the outlet ports and a back side located on the side of the inlet ports, the handle comprising a peripheral wall extending globally parallel to the longitudinal axis X-X from its back side, thereby defining a bore wherein the inlet connectors are accommodated completely.
- the peripheral wall is made integral with the handle.
- the length of the peripheral wall, measured parallel to the longitudinal axis X-X, is comprised between 50 and 300 mm, preferably between 100 and 250 mm.
- the external width of the peripheral wall, measured perpendicular to the longitudinal axis X-X, is comprised between 30 and 70 mm, preferably between 40 and 60 mm.
- the torch comprises a body attached to the front side of the handle and flow regulation means being mounted on the body in fluidic communication with the outlet ports respectively, so as to regulate the flow of the fuel gas and/or the flow of the oxidizing gas delivered by the outlet ports when operating the torch.
- the torch is a cutting torch comprising additional flow regulation means mounted on the body for regulating an additional flow of cutting oxidizing gas.

According to another aspect, the invention relates to an oxy-fuel assembly comprising an oxy-fuel torch according to any of the preceding claims and intermediate connection means configured to fluidly connect each inlet connectors to a corresponding gas hose.

Preferably, the intermediate connection means comprise quick connectors, each quick connector having a female head portion configured to mate with a male coupling portion of each inlet connectors and a terminal portion configured to be connected with a hose connector to be attached to a gas hose.

Furthermore, the invention relates to a method for cutting, welding, brazing or heating at least on metallic workpiece using an assembly according to the invention, wherein each inlet connectors is fluidly connected to a corresponding gas hose via intermediate connection means, and wherein at least a flow of oxidizing gas, in particular oxygen or an oxygen-containing gas, and a flow of fuel gas, in particular acetylene or an hydrocarbon-containing gas, are dispensed in said corresponding hoses.

The invention may also relate to any device or alternative process comprising any combination of features above or below.

BRIEF DESCRIPTION OF THE DRAWINGS

Other features and advantages will become apparent upon reading the following description with reference to the drawings in which.

DETAILED DESCRIPTION OF THE INVENTION

Figure 1:
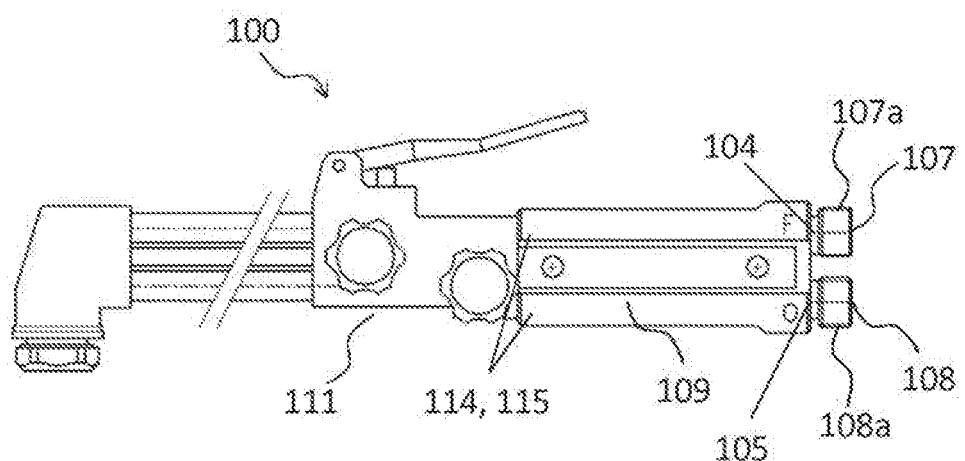
FIG. 1 shows an oxy-fuel torch according to the prior art.

Referring to FIG. 1, a conventional oxy-fuel torch 100 comprises a handle 109 incorporating at least two gas channels (not shown) for feeding at least two gas flows between at least two inlet ports 104, 105 and at least two outlet ports 114, 115 located in the handle 109.

Two inlet connectors 107, 108 are fluidly connected to inlet ports 104, 105 respectively. The torch is equipped with threaded connectors 107, 108 each having and axial bore (not shown) and a threaded external surface portion 107a, 107b. In general, the inlet connectors are fixed on the handle 109 by, for example by welding on the handle or part of the handle.

The inlet connectors 107, 108 are intended to fluidly connect each inlet port 104, 105 to a corresponding gas hose via intermediate connection means.

At least one gas hose is fluidly connected to a fuel gas cylinder at one end and to the inlet connector 107 at the other hose end so that a flow of fuel gas can be dispensed into the inlet port 104 when operating the torch.

At least one other gas hose is fluidly connected to an oxidizing gas cylinder at one end and to the inlet connector 108 at the other end so that a flow of oxidizing gas can be dispensed into the inlet port 105 when operating the torch.

Figure 2A:
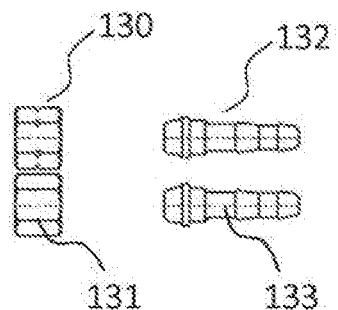
FIGS. 2A and 2B show connecting means for fluidly connecting the torch of FIG. 1 to gas hoses according to the prior art.
Figure 2B:
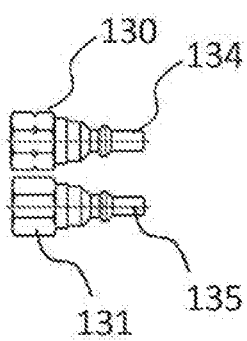

FIGS. 2A and 2B shows examples of intermediate connection means that are used conventionally in oxy-fuel torches. Coupling nuts 130, 131 can be used as threaded fasteners for joining the externally threaded inlet connectors 107, 108 to hose tails 132, 133. The nuts 130, 131 have internal threads that match up with the male threaded inlet connectors 107, 108. The hose tails 132, 133 are intended to be slide inside the ends of the corresponding gas hoses and are held in place by a ferrule that has been crimped. The nuts can be turned by hand or a wrench to tighten the nut onto the torch. Another solution is based on quick connection nipples 134, 135 which are threaded onto each inlet connector 107, 108 via threaded nuts 130, 131.

Figure 3A:
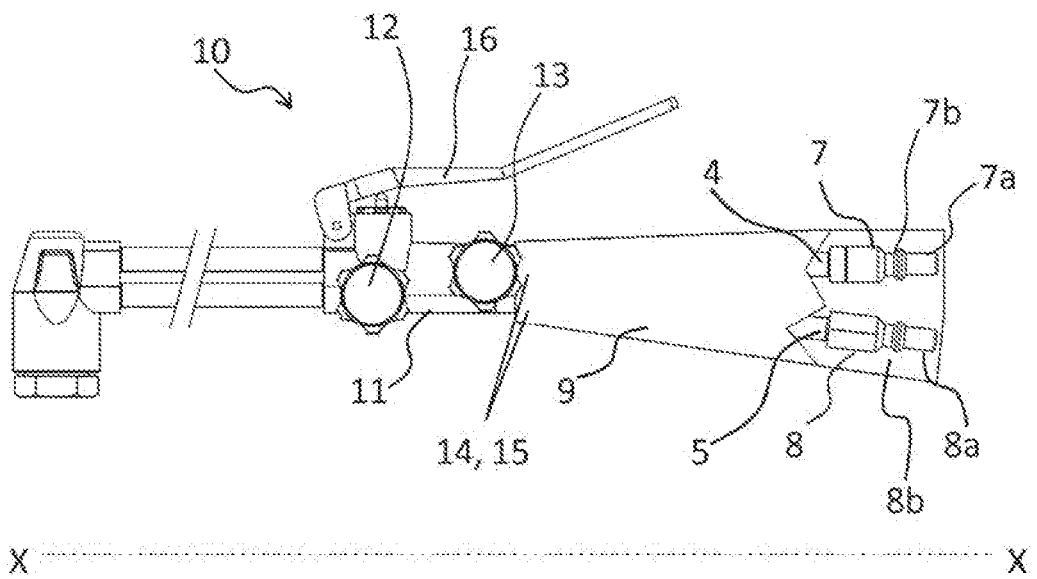
FIG. 3A shows an oxy-fuel torch according to one embodiment of the invention and FIG. 3B shows connecting means intended to be connected to the torch of FIG. 3A.
Figure 3B:
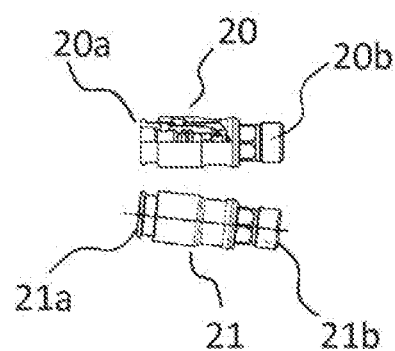

Now referring to FIGS. 3A and 3B, the oxy-fuel torch 10 according to one embodiment of the invention comprises at least two gas channels extending through the handle 9 for conveying at least a flow of fuel gas and a flow of oxidizing gas between the respective inlet ports 4, 5 and outlet ports 14, 15 that are arranged in or on the handle 9.

With respect to the present invention an inlet port or an outlet port may be understood as any orifice, or any device or member comprising an orifice, adapted to dispense or receive a fluid flow.

The inlet connectors 7, 8 are mounted on the handle 9 and are in fluidic communication with each inlet 4, 5. The inlet connectors 7, 8 are configured to fluidly connect each inlet port 4, 5 to a corresponding gas hose via intermediate connection means 20, 21.

According to the invention, each inlet connector 7, 8 is a non-threaded connector and is permanently connected with each respective inlet port 4, 5 of the torch 10.

The terms "non-threaded" mean that there is no thread provided on the external or internal part of the inlet connectors.

Permanent connection means that joining is not based on removable fasteners such as nuts or screws. This type of fastening is not supposed to be removed and if removed, may affect the base material of the parts that were connected.

Owing to the invention, it is possible to manufacture a single type of oxy-fuel torch, having a given type of inlet connectors, which is suitable for all countries. The intermediate connection means 20, 21 can be supplied separately from the torch and have the features adapted to the country standards of the gas hose connectors. This leads to a decrease in manufacturing costs, as well as a more reliable device thanks to the reduced number of threaded connection interfaces, in comparison with the devices of prior art.

Each inlet connector 7, 8 may be joined to its corresponding inlet port 4, 5 by an appropriate joining process such as fusion welding, soldering, adhesive bonding, screwing.

Preferably, the inlet connectors 7, 8 are made at least in part of a metallic material that can be chosen among: copper, copper alloys, copper alloys with surface treatment, stainless steels, carbon steels, aluminum, aluminum alloys, zinc alloys. The inlet ports 4, 5 may be made at least in part of a metallic material that can be chosen among: copper alloys, copper alloys with surface treatment, stainless steels, carbon steels, aluminum, aluminum alloys, zinc alloys. The handle can be in metallic material or in plastic material.

Advantageously, each inlet connector 7, 8 is joined to the corresponding inlet port 4, 5 by brazing. Brazed joints offer the advantage of being as strong as the base materials being joined. Brazing is also effective at joining dissimilar metals. The brazing filler metal may be chosen among: copper alloys, silver alloys, tin alloys, zinc alloys.

Preferably, the intermediate connection means 20, 21 are configured to be mechanically fastened to the inlet connectors at a one end, and are configured to be mechanically fastened to gas hose connectors at another end. These fastening are removable.

According to a preferred embodiment of the invention, the intermediate connection means 20, 21 comprise quick connectors 20, 21, each inlet connectors 7, 8 having a male coupling portion 7a, 8a configured to cooperate with a female head portion 20a, 21a of each quick connector 20, 21 in order to retain said inlet connectors 7, 8 and said quick connectors 20, 21 in fastened configuration. Advantageously, the corresponding male coupling portion 7a, 8a and female head portion 20a, 21a are adapted to fit axially in each other.

In the particular embodiment illustrated in FIG. 3A, each male coupling portion 7a, 8a is provided with an element in relief 7a, 7b adapted to cooperate with a corresponding element in relief (not visible in FIG. 3B) of the female head portion 20a, 21a of each quick connector 20, 21, so as to retain said elements in relief in fitted configuration.

More preferably, each male coupling portion 7a, 8a may comprise a tubular member provided with a circumferential protrusion 7a, 7b, preferably an external protrusion 7a, 7b. Said protrusions 7a, 7b are arranged at a predetermined distance d from the free end of the tubular member so as to engage at least one bearing or recess of the female head portion 20a, 21a. The predetermined distance d can be comprised between 5 and 25 mm. The tubular member has an outside diameter comprised between 5 and 25 mm.

In a way known per se, the quick connectors 20, 21 can be quick-connect push-on or pull-on fittings.

Advantageously, the quick connectors 20, 21 comprise terminal portions 20b, 21b configured to be connected with hose connectors or hose tails (not illustrated) to be attached to corresponding gas hoses. Preferably, the terminal portions 20b, 21b comprise threaded portions intended to be connected to corresponding threaded hose connectors mounted at each end of the gas hoses.

Advantageously, the threaded portions on the terminal portions 20b, 21b are handed to avoid dangerous misconnection of the gas hoses. Preferably, the thread on the terminal portion 21b intended to receive the connector of the oxidizing gas hose is right-handed, while the terminal portion 20b intended to receive the connector of the fuel gas hose has a left-handed thread.

Advantageously, the inlet connectors 7, 8 and/or the intermediate connection means 20, 21 may have a visible distinguishing feature such as an identifying groove cut into their external surface. This improves the prevention of an accidental connection of a fuel gas supply to an oxidizing gas conveying system or vice versa.

Figure 4:
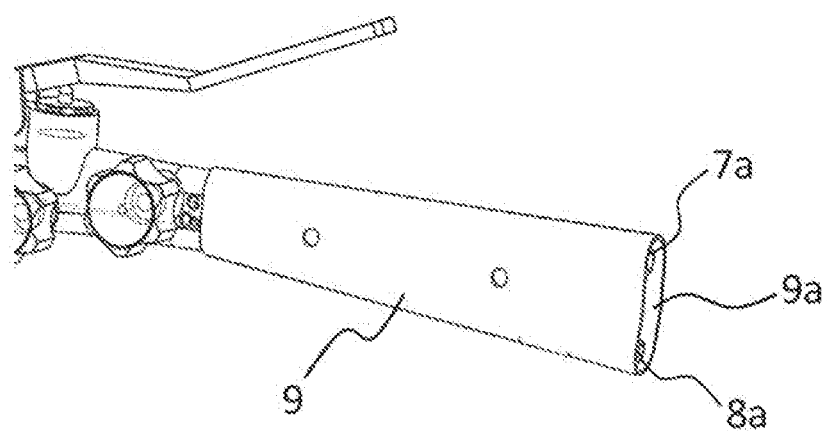
FIG. 4 shows one embodiment of the handle of the torch shown in FIG. 3A.

The FIGS. 3A and 4 illustrates a preferred embodiment of a torch handle 9 incorporating inlet connectors 7, 8 according to the invention.

The handle 9 extends globally parallel to a longitudinal axis X-X between a front side located on the side of the outlet ports 14, 15 and a back side located on the side of the inlet ports 4, 5.

Advantageously, the handle 9 comprises a peripheral wall 9a extending globally parallel to the longitudinal axis X-X from its back side, thereby defining a bore wherein the inlet connectors 7, 8 are accommodated completely, as shown in FIG. 4.

In other words, considering the embodiment shown in FIG. 3A, the peripheral wall 9a extend at least beyond the terminal end of the portions 7a, 7b of the inlet connectors 7, 8.

This offers an improved protection of the inlet connectors 7, 8 against damage that could occur during handling, transportation or a drop of the torch.

The peripheral wall 9a may have a globally oblong transverse section.

Preferably, the peripheral wall 9a is made integral with the handle 9. This makes the handle 9 more robust.

The length of the peripheral wall 9a, measured parallel to the longitudinal axis X-X, may be comprised between 50 and 300 mm, preferably between 100 and 250 mm. The external width of the peripheral wall 9a, measured perpendicular to the longitudinal axis X-X, may be comprised between 30 and 70 mm, preferably between 40 and 60 mm.

The invention is applied advantageously to an oxy-fuel cutting torch. In addition to flow regulation means 12, 13 mounted on the body 11 of the torch so as to regulate the flow of the fuel gas and/or the flow of the oxidizing gas delivered by the outlet ports 14, 15, the torch comprises additional flow regulation means 16 arranged on the body 11 so as to regulate an additional stream of a cutting oxidizing gas.

Said additional regulation means may comprise a lever 16 configured to cooperate with an additional valve (not shown), said lever 16 being displaceable between a rest position in which said valve prevents the cutting gas to flow out of the body 11, and an active position in which at least the valve allows the cutting gas to flow out of the body 11.

What is claimed is:

1. An oxy-fuel torch comprising:
a handle by which the torch can be manipulated;
at least two gas channels arranged through said handle for conveying at least a flow of fuel gas and a flow of oxidizing gas between respective inlets ports and outlet ports; and
inlet connectors in fluidic communication with each inlet ports, the inlet connectors being configured to fluidly connect each inlet port to a corresponding gas hose via intermediate connection means,
wherein each inlet connector is a non-threaded connector and is permanently connected with each respective inlet port,
wherein the intermediate connection means comprise quick connectors, each of the inlet connectors having a male coupling portion configured to cooperate with a female head portion of each quick connector in order to retain said inlet connectors and said quick connectors in fastened configuration,
wherein each male coupling portion comprises a tubular member provided with at least one circumferential protrusion arranged at a predetermined distance from a free end of the tubular member so as to engage at least one bearing of the female head portion of each quick connector with said protrusion, and
wherein the handle extends parallel to a longitudinal axis between a front side located on a side of the outlet ports and a back side located on a side of the inlet ports, the handle comprising a peripheral wall extending beyond the free end of the tubular member of each male coupling portion and defining a bore, wherein the inlet connectors are located completely within the bore.

2. The oxy-fuel torch of claim 1, wherein each inlet connector is joined to each inlet port by brazing.

3. The oxy-fuel torch of claim 1, wherein the peripheral wall is made integral with the handle.

4. The oxy-fuel torch of claim 1, wherein a length of the peripheral wall, measured parallel to the longitudinal axis, is between 50 and 300 mm.

5. The oxy-fuel torch of claim 1, wherein a length of the peripheral wall, measured parallel to the longitudinal axis, is between 100 and 250 mm.

6. The oxy-fuel torch of claim 5, wherein an external width of the peripheral wall, measured perpendicular to the longitudinal axis, is between 30 and 70 mm.

7. The oxy-fuel torch of claim 5, wherein an external width of the peripheral wall, measured perpendicular to the longitudinal axis, is between 40 and 60 mm.

8. The oxy-fuel torch of claim 1, further comprising a body attached to a front side of the handle, and flow regulation means being mounted on the body in fluidic communication with the outlet ports respectively, so as to regulate the flow of the fuel gas and/or the flow of the oxidizing gas delivered by the outlet ports when operating the torch.

9. The oxy-fuel torch of claim 8, wherein the torch is a cutting torch comprising additional flow regulation means mounted on the body for regulating an additional flow of cutting oxidizing gas.

10. An oxy-fuel torch comprising:
a handle by which the torch can be manipulated;

at least two gas channels arranged through said handle for conveying at least a flow of fuel gas and a flow of oxidizing gas between respective inlets ports and outlet ports; and inlet connectors in fluidic communication with each inlet ports, the inlet connectors being configured to fluidly connect each inlet port to a corresponding gas hose via intermediate connectors, wherein each inlet connector is a non-threaded connector and is permanently connected with each respective inlet port, wherein the intermediate connectors comprise quick connectors, each of the inlet connectors having a male coupling portion configured to cooperate with a female head portion of each quick connector in order to retain said inlet connectors and said quick connectors in fastened configuration, wherein each male coupling portion comprises a tubular member provided with at least one protrusion that is spaced at a distance from a free end of the tubular member so as to engage at least one bearing of the female head portion of each quick connector with said protrusion, and wherein the handle extends parallel to a longitudinal axis between a front side located on a side of the outlet ports and a back side located on a side of the inlet ports, the handle comprising a peripheral wall extending beyond the free end of the tubular member of each male coupling portion and defining a bore, wherein the inlet connectors are located completely within the bore.

11. The oxy-fuel torch of claim 10, wherein each inlet connector is joined to each inlet port by brazing.

12. The oxy-fuel torch of claim 10, wherein the peripheral wall is made integral with the handle.

13. The oxy-fuel torch of claim 10, wherein a length of the peripheral wall, measured parallel to the longitudinal axis, is between 50 and 300 mm.

14. The oxy-fuel torch of claim 10, wherein a length of the peripheral wall, measured parallel to the longitudinal axis, is between 100 and 250 mm.

15. The oxy-fuel torch of claim 14, wherein an external width of the peripheral wall, measured perpendicular to the longitudinal axis, is between 30 and 70 mm.

16. The oxy-fuel torch of claim 14, wherein an external width of the peripheral wall, measured perpendicular to the longitudinal axis, is between 40 and 60 mm.

17. The oxy-fuel torch of claim 10, further comprising a body attached to a front side of the handle, and a flow regulator mounted on the body in fluidic communication with the outlet ports respectively, so as to regulate the flow of the fuel gas and/or the flow of the oxidizing gas delivered by the outlet ports when operating the torch.

18. An oxy-fuel torch comprising:
a handle by which the torch can be manipulated;
at least two gas channels arranged through said handle for conveying at least a flow of fuel gas and a flow of oxidizing gas between respective inlets ports and outlet ports; and
inlet connectors in fluidic communication with each inlet ports, the inlet connectors being configured to fluidly connect each inlet port to a corresponding gas hose via intermediate connectors,
wherein each inlet connector is a non-threaded connector and is permanently connected with each respective inlet port,
wherein the intermediate connectors comprise quick connectors, each of the inlet connectors having a first coupling portion configured to cooperate with a second coupling portion of each quick connector in order to retain said inlet connectors and said quick connectors in fastened configuration,
wherein each first coupling portion comprises a tubular member terminating at a free end, and wherein the handle extends parallel to a longitudinal axis between a front side located on a side of the outlet ports and a back side located on a side of the inlet ports, the handle comprising a peripheral wall extending beyond the free end of the tubular member of each first coupling portion and defining a bore, wherein the inlet connectors are located completely within the bore.

19. The oxy-fuel torch of claim 18, wherein an external width of the peripheral wall, measured perpendicular to the longitudinal axis, is between 30 and 70 mm.

20. The oxy-fuel torch of claim 18, wherein an external width of the peripheral wall, measured perpendicular to the longitudinal axis, is between 40 and 60 mm.

* * * * *